(12) United States Patent
Bahaa et al.

(10) Patent No.: US 11,153,626 B1
(45) Date of Patent: Oct. 19, 2021

(54) SYSTEMS AND METHODS FOR TRANSFORMING A FRAGMENT MEDIA PLAYER INTO AN ACCESS UNIT MEDIA PLAYER

(71) Applicant: Amazon Technologies, Inc., Seattle, WA (US)

(72) Inventors: Mahmoud Bahaa, London (GB); Daniel Roy Cattlin, London (GB); Maximiliano Garrone Ten Brink, London (GB); Ihsan Mert Ozcelik, London (GB)

(73) Assignee: Amazon Technologies, Inc., Seattle, WA (US)

( * ) Notice: Subject to any disclaimer, the term of this patent is extended or adjusted under 35 U.S.C. 154(b) by 85 days.

(21) Appl. No.: 16/416,655

(22) Filed: May 20, 2019

(51) Int. Cl.
*H04N 21/278* (2011.01)
*H04N 21/218* (2011.01)
*H04N 21/2387* (2011.01)
*H04N 21/254* (2011.01)

(52) U.S. Cl.
CPC ....... *H04N 21/278* (2013.01); *H04N 21/2181* (2013.01); *H04N 21/2387* (2013.01); *H04N 21/2541* (2013.01)

(58) Field of Classification Search
CPC ............. H04N 21/235; H04N 21/2365; H04N 21/236; H04N 21/435; H04N 21/234309; H04N 21/85406; H04N 21/234363; H04N 21/2662; H04N 21/4402; H04N 21/440218; H04N 21/25808
See application file for complete search history.

(56) References Cited

U.S. PATENT DOCUMENTS

| | | | | |
|---|---|---|---|---|
| 7,274,706 B1 * | 9/2007 | Nguyen | .................. | H04L 12/56 370/419 |
| 2003/0140159 A1 * | 7/2003 | Campbell | ............. | H04L 69/165 709/231 |
| 2004/0075768 A1 * | 4/2004 | Law | .................. | H04N 21/25808 348/554 |

(Continued)

OTHER PUBLICATIONS

"ExoPlayer," 2019, retrieved from https://exoplayer.dev/ on May 9, 2019, 1 page.

(Continued)

*Primary Examiner* — Jason Salce
(74) *Attorney, Agent, or Firm* — Nicholson De Vos Webster & Elliott LLP

(57) ABSTRACT

Techniques for transforming a fragment media player into an access unit media player are described. As one example, a computer-implemented method includes receiving a play request for access units of media from a front end media player by a rendering engine, receiving the access units of media from the front end media player by a sample stream component of a fragment media player; storing the access units of media in a sample queue of the sample stream component, storing respective metadata for the access units in a metadata queue of the sample stream component, sending pulling the access units and the respective metadata by a renderer of the fragment media player based on the play request, and rendering the access units and the respective metadata with the renderer of the fragment media player to generate rendered media.

20 Claims, 13 Drawing Sheets

(56) References Cited

U.S. PATENT DOCUMENTS

| | | | | |
|---|---|---|---|---|
| 2005/0021810 | A1* | 1/2005 | Umemura | G09G 5/363 709/231 |
| 2005/0089093 | A1* | 4/2005 | Su | H04N 21/23439 375/240.12 |
| 2006/0291811 | A1* | 12/2006 | Suzuki | H04N 7/17318 386/248 |
| 2007/0143633 | A1* | 6/2007 | Shiiba | G06F 21/10 713/193 |
| 2007/0156603 | A1* | 7/2007 | Yoon | H04N 21/2541 705/59 |
| 2008/0101404 | A1* | 5/2008 | Ross | H04N 21/23406 370/465 |
| 2009/0055417 | A1* | 2/2009 | Hannuksela | G06F 16/907 |
| 2010/0135646 | A1* | 6/2010 | Bang | H04N 21/85406 386/241 |
| 2012/0233648 | A1* | 9/2012 | Raman | H04N 21/4622 725/93 |
| 2015/0089023 | A1* | 3/2015 | Phillips | H04N 21/4667 709/219 |
| 2018/0278963 | A1* | 9/2018 | Schueuer | H04N 19/65 |

OTHER PUBLICATIONS

"Hello world!—ExoPlayer," 2019, retrieved from https://exoplayer.dev/hello-world.html on May 9, 2019, 3 pages.

"Interface ExoPlayer," 2019, retrieved from https://exoplayer.dev/doc/reference/com/google/android/exoplayer2/ExoPlayer.html on May 9, 2019, 7 pages.

"Interface LoadControl," 2019, retrieved from https://exoplayer.dev/doc/reference/com/google/android/exoplayer2/LoadControl.html on May 9, 2019, 4 pages.

Wikipedia, "Presentation and Access Units," 2019, retrieved from https://en.wikipedia.org/wiki/Presentation_and_access_units on May 9, 2019, 4 pages.

* cited by examiner

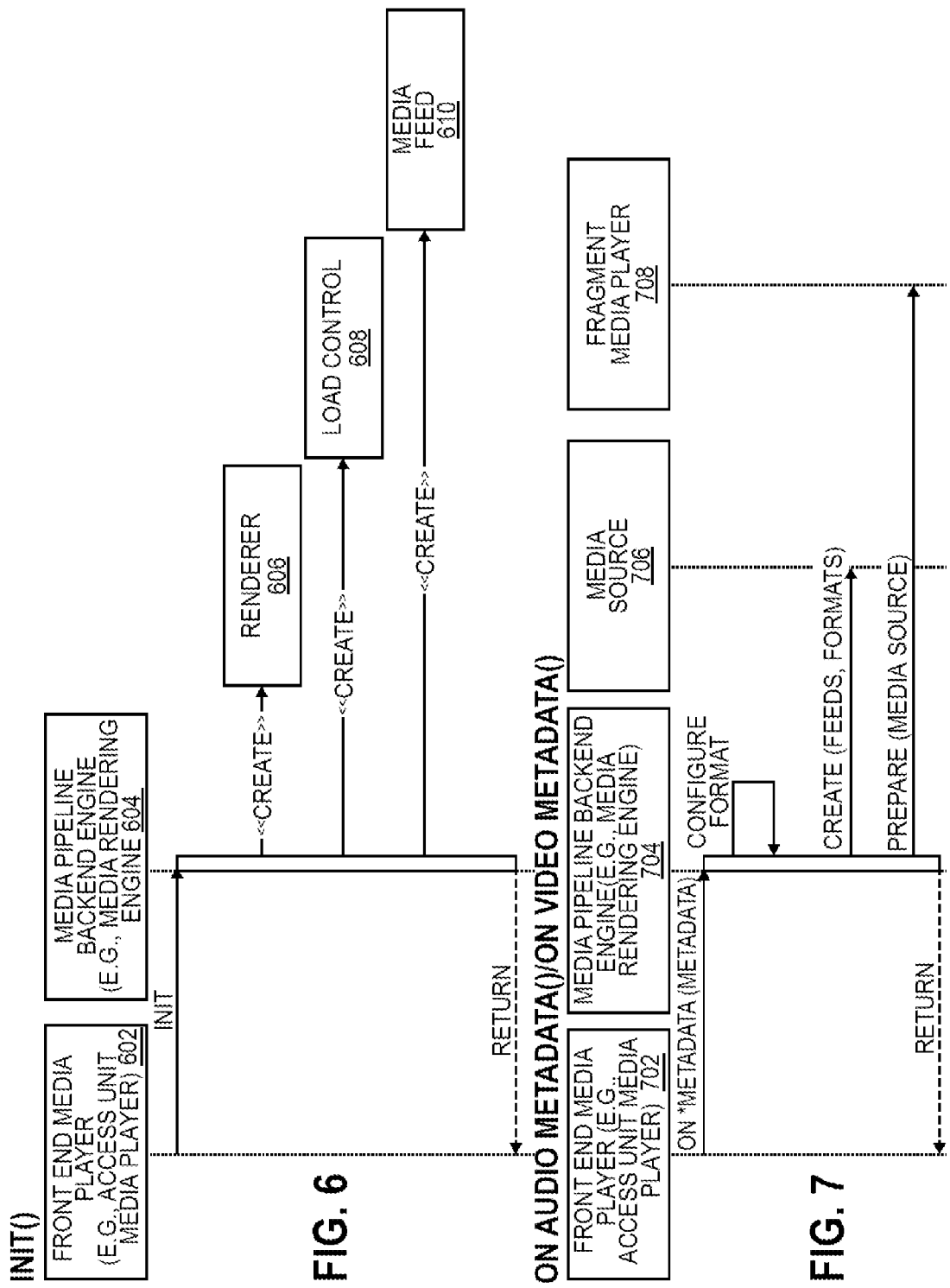

US 11,153,626 B1

SYSTEMS AND METHODS FOR TRANSFORMING A FRAGMENT MEDIA PLAYER INTO AN ACCESS UNIT MEDIA PLAYER

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various embodiments in accordance with the present disclosure will be described with reference to the drawings, in which:

FIG. 6 is a diagram illustrating an initialization of a media rendering system according to some embodiments.

FIG. 7 is a diagram illustrating decoder configuration of a media rendering system according to some embodiments.

DETAILED DESCRIPTION

Figure 1:
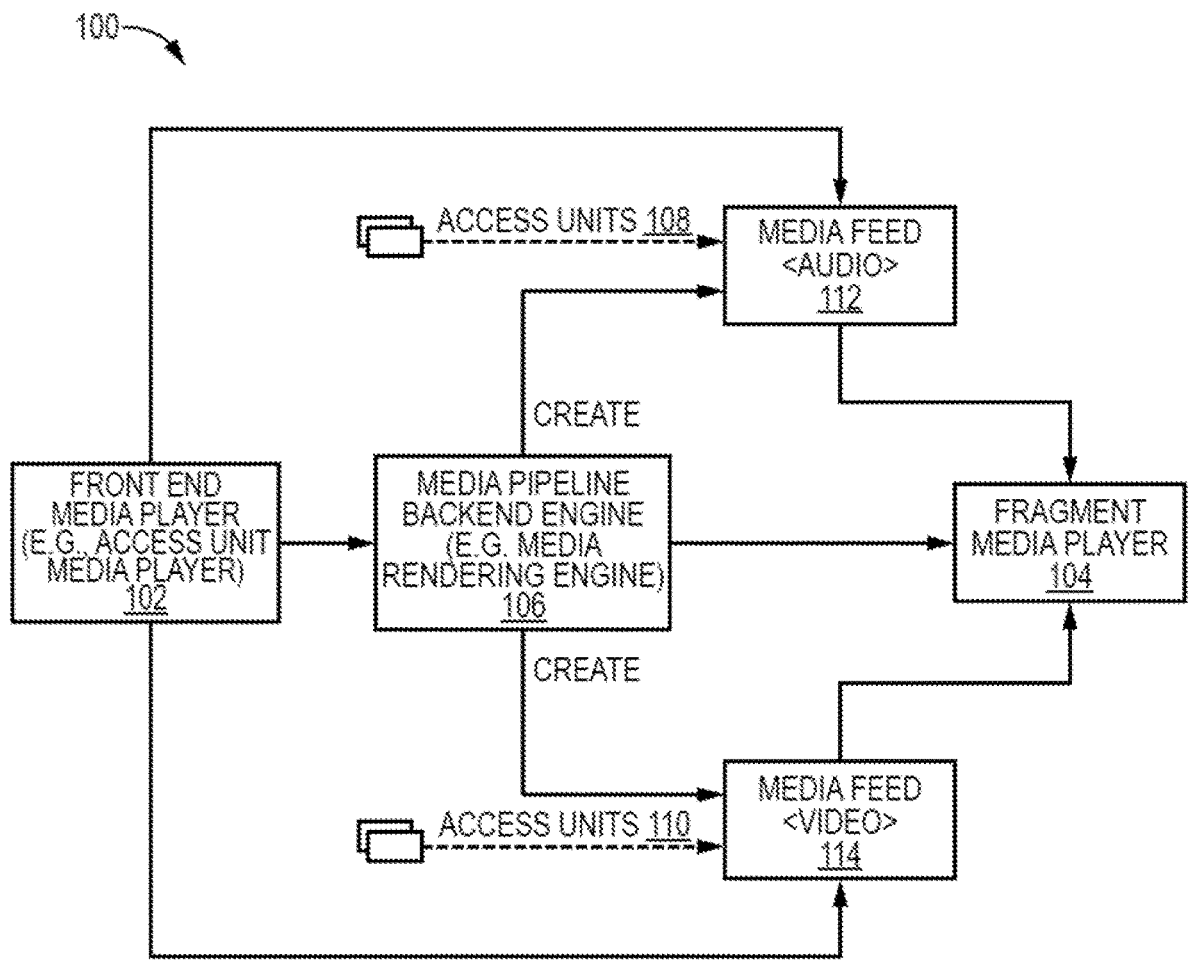
FIG. 1 is a diagram illustrating an audio and video pipeline having a front end media player coupled to a fragment media player according to some embodiments.

Various embodiments of methods, apparatus, systems, and non-transitory computer-readable storage media for playback of media are described. According to some embodiments, access units of media are rendered with a renderer of a fragment media player. Certain devices (e.g., "smart televisions" or "smart TVs") include digital media players to play media, e.g., media streamed in from a remote content data store. However, a first device (e.g., from a first manufacturer) and a second device (e.g., from a second, different manufacturer) may have different rendering functionality, for example, different codecs (e.g., coder and/or decoder). In certain embodiments, a renderer utilizes a codec to decode a (e.g., encrypted) data stream for playback. The lack of uniformity of the rendering functionality may cause performance problems, e.g., mis-synchronization of video and audio, frame dropping, audio stuttering, etc.). Embodiments herein provide a performant playback component that runs reliably across devices having different rendering functionalities (e.g., from different manufacturers).

In one embodiment, a device (e.g., a smart TV) utilizes an operating system, that when executed, provides functionality to display video and play respective audio. One example of an operating system is Android TV from Google LLC. An operating system may be a standard platform from the development perspective, but playback may be different where the operating system utilizes codec(s) provided by the device (e.g., chipset) manufacturers. This may result in playback issues that vary from one device to the other. Embodiments herein utilize a renderer (e.g., and its codecs) of a fragment media player to render (e.g., and then play) access units of media. One example of a fragment media player is ExoPlayer from Google LLC.

A fragment media player may be a fully-fledged fragment-level media player, for example, one that uses streaming files (e.g., MPD files) and/or container formatted files (e.g. MP4 files) for playback. The fragment media player may then execute to play the media from the fragments. This execution may include a plurality of stages, for example, manifest parsing, requesting digital rights management (DRM) license(s), adaptive bitrate which controls the requested bitrate, requesting and demultiplexing fragments into access units, and (e.g., as a last stage) decoding, decrypting, rendering and synchronizing audio and video. The decoding, decrypting, rendering and synchronizing audio and video may be referred to as a "rendering pipeline". An access unit may be a logical substructure of an elementary stream formed by binary audio and video flows and compressed to facilitate the bit stream manipulation access. An access unit may be the smallest data organization than it is possible to be attributed to the systems of synchronization of a layer of compression. For a video stream, there may be three types of compressed access units, e.g., (i) images type I (Intra-coded) that are codified without reference to other images, e.g., they contain all the necessary elements for its reconstruction, (ii) images P type (Predicted) that are codified with respect to the image of type I or another previous P, e.g., via he techniques of prediction with compensation of movement (e.g., with a compression rate that is greater than the one of images I), and (iii) images B type (Bi-directional predicted) that are codified by interpolation between two images of I type or preceding and following P frames that them (e.g., to offer a higher rate compression). In one embodiment, the video sequence codification result is a succession of video access units. For an audio stream (e.g., corresponding to the video stream), the audio access unit may contain a few milliseconds of audio. In one embodiment, audio sequence codification result is a succession of audio access units.

Certain embodiments herein utilize a fragment media player (e.g., only) for its rendering pipeline and utilizes another media player (e.g., another fragment media player or an access unit media player) for the other stages. An example of another media player is an access unit player that only plays media that are access units rather than fragments. One option is providing a media player that has a fragment media player's rendering pipeline. However, such an option may cause a lack of maintainability, for example, where, with each new fragment media player release (e.g., update), updating that media player is a major overhead. Therefore, certain embodiments herein provide a rendering system that leverages a fragment media player's implementation (e.g., and updatability and/or maintenance) while using it as an access unit media player.

Certain embodiments herein provide for custom fragment media player components and injects them into a framework (e.g., ExoPlayer, GStreamer, etc.). Certain embodiments herein provide an engine (e.g., a media pipeline backend engine) to control the interaction with a front end media player (e.g., providing all functionality except rendering) and a fragment media player's dependencies. In one embodiment, a fragment media player is a pull model because the audio/video renderers pull the data when the (e.g., secure) codec is ready to decrypt and/or decode the media. However, a front end media player may be a push model that pushes access units of data to the access unit media player. Certain embodiments herein provide a component to push access units of data to a fragment media player, e.g., either by demultiplexing fragments or loading the access units from local storage. Certain embodiments herein provide a sample data queue and metadata queue to implement a sink that receives access units of data from the front end media player and provides it for the fragment media player to pull from. Thus, certain embodiments herein provide a clean, reusable way of leveraging a fragment media player's rendering pipeline without impacting the updatability and maintenance of that fragment media player, to render media for an access unit media player.

FIG. 1 is a diagram illustrating an audio and video pipeline 100 having a front end media player (e.g., a full-stack player or an access unit media player) 102 coupled to a fragment media player 104 according to some embodiments. In one embodiment, media pipeline backend engine 106 (e.g., media rendering engine) receives a request to play (e.g., or pause, seek, stop, or other playback control request) media (e.g., including audio and video) from front end media player 102, for example, based on a user requesting a device (e.g., electronic device(s) 1560 in FIG. 15, computing device 1600 in FIG. 16 or electronic device 1702 in FIG. 17) that includes audio and video pipeline 100 to play that media. In one embodiment, the front end media player 102 is also to push access units (e.g., audio access units 108 and video access units 110) for playback. In the depicted embodiment, audio access units 108 are stored in media feed 112 for audio and video access units 110 are stored in media feed 114 for video. Audio media feed 112 and/or video media feed 114 may be an instance of sample data feed 301 in FIG. 3. In certain embodiments, the audio data (access unit) feed, video data feed, and playback control feed (e.g. play, pause, seek, or stop) proceed independent of the other feeds to avoid bottlenecks.

The media pipeline backend engine 106 handles control events and synchronizes the pull of data from the audio media feed 112 and/or video media feed 114 by the fragment media player 104 in certain embodiments. In one embodiment, the media pipeline backend engine 106 initializes the audio media feed 112 and video media feed 114 (e.g., by sending a respective "create" indication as depicted). In certain embodiments, the media pipeline backend engine 106 controls the amount of data (e.g., the number of access units) stored (e.g., queued) in the audio media feed 112 and/or (e.g., independently) the amount of data (e.g., the number of access units) stored (e.g., queued) in the video media feed 114. Here, the media pipeline backend engine 106 may be used to convert the push of data (e.g., access units) from front end media player 102 into the audio media feed 112 and video media feed 114 that the fragment media player 104 pulls its data from, e.g., data that is to have rendering performed on it. Certain embodiments herein remove the control of downloading media (e.g., from a content data store) from a fragment media player but retain the rendering functionality of the fragment media player.

Figure 2:
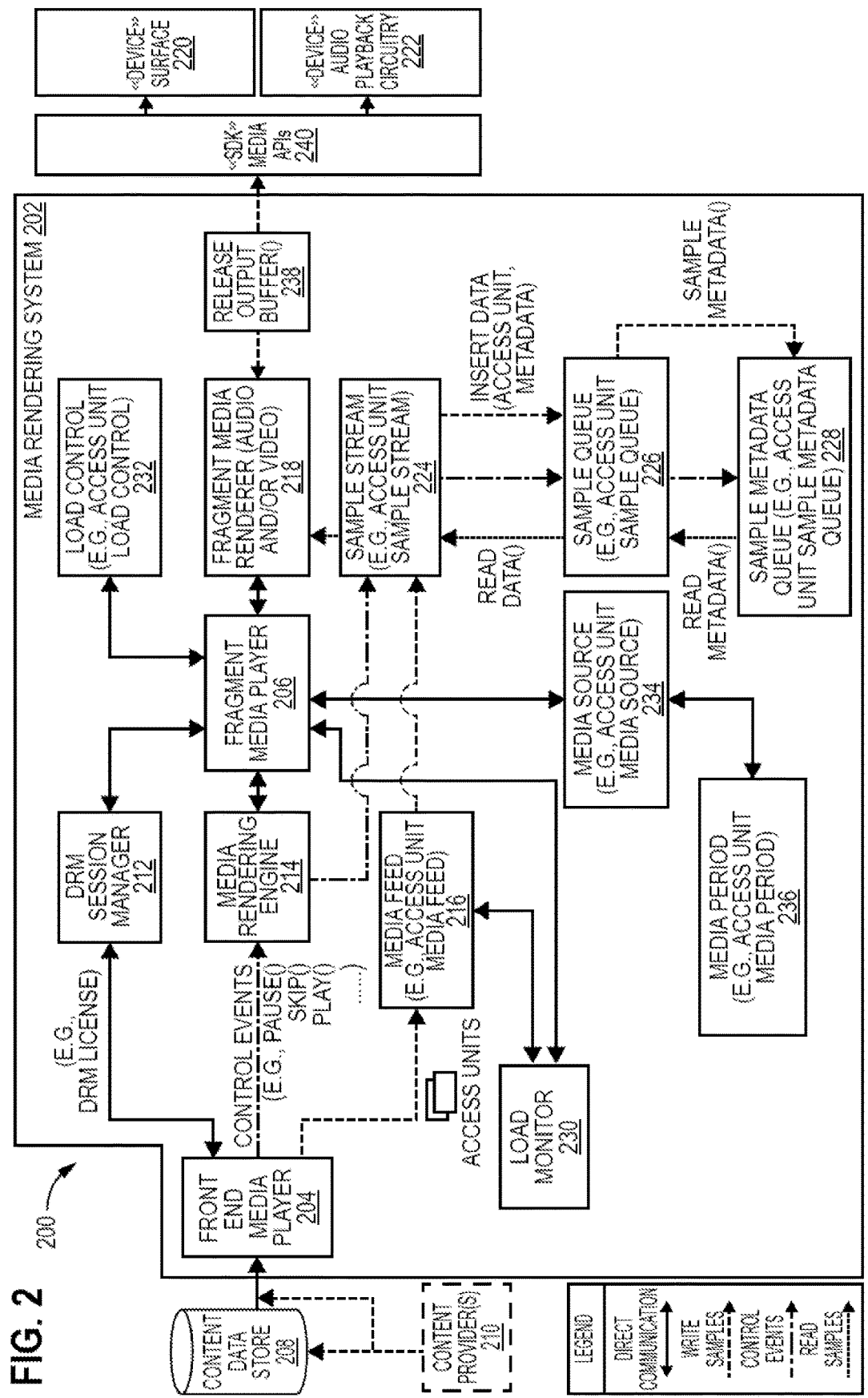
FIG. 2 is a diagram illustrating an environment including a media rendering system that couples a front end media player to a fragment media player according to some embodiments.

Turning now to FIG. 2, a more detailed embodiment is described. FIG. 2 is a diagram illustrating an environment 200 including a media rendering system 202 that couples a front end media player 206 to a fragment media player 206 according to some embodiments. The depicted environment 200 includes a content data store 208, which may be implemented in one or more data centers. Optionally, content provider(s) 210 may be included to provide a media file (e.g., access units of media), for example, directly to the media rendering system 202 without utilizing the content data store 208 or into storage in content data store 208. Note that the legend depicts certain communication types, but these are merely examples and other types may be used. In certain embodiments, fragment media player 206 has no indication of the existence of front end media player 204 (e.g., access unit media player). In certain embodiments, fragment media player 206 (e.g., controller thereof) controls the performance of a playback of media.

Figure 15:
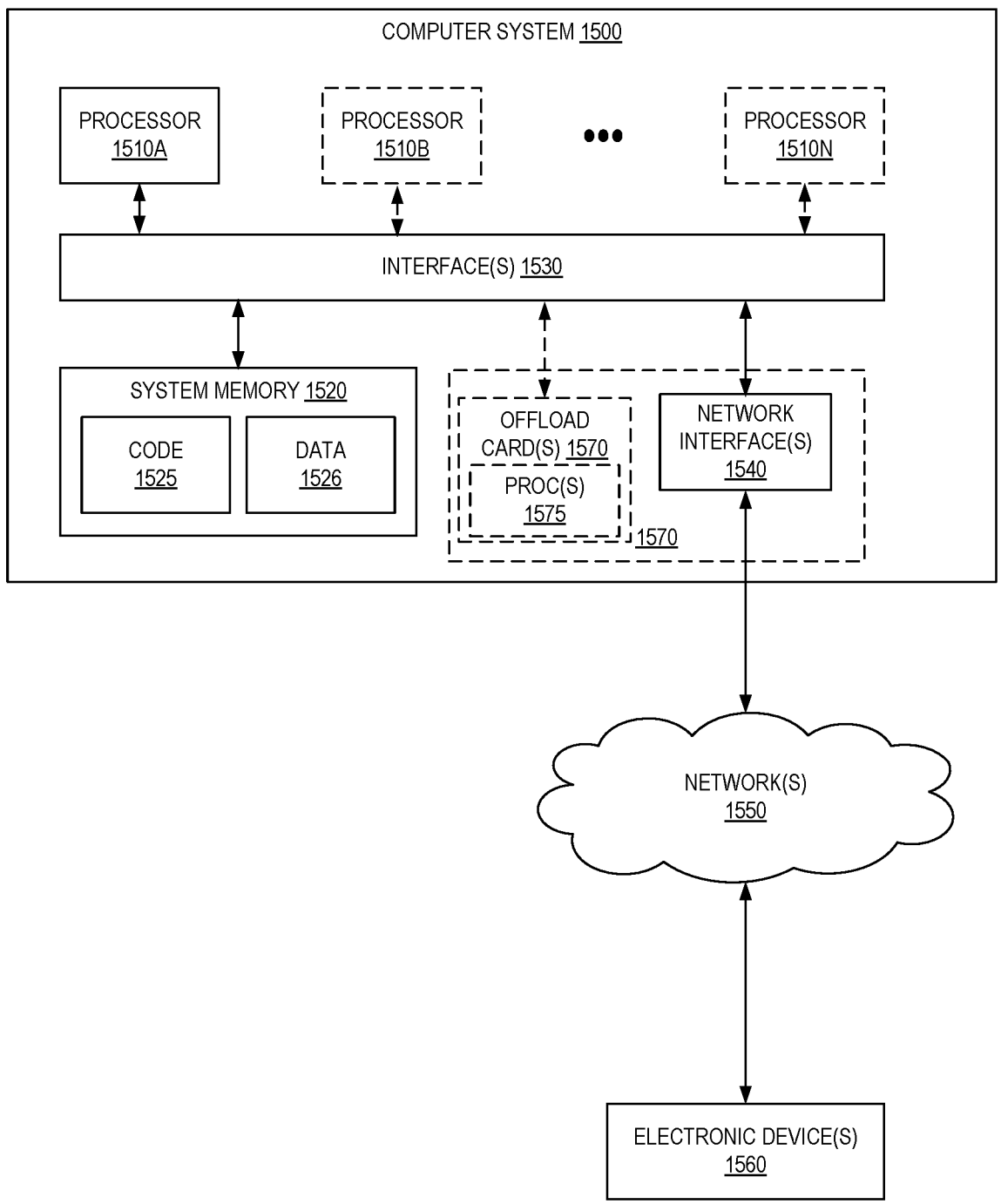
FIG. 15 is a block diagram illustrating an example computer system that may be used in some embodiments.
Figure 16:
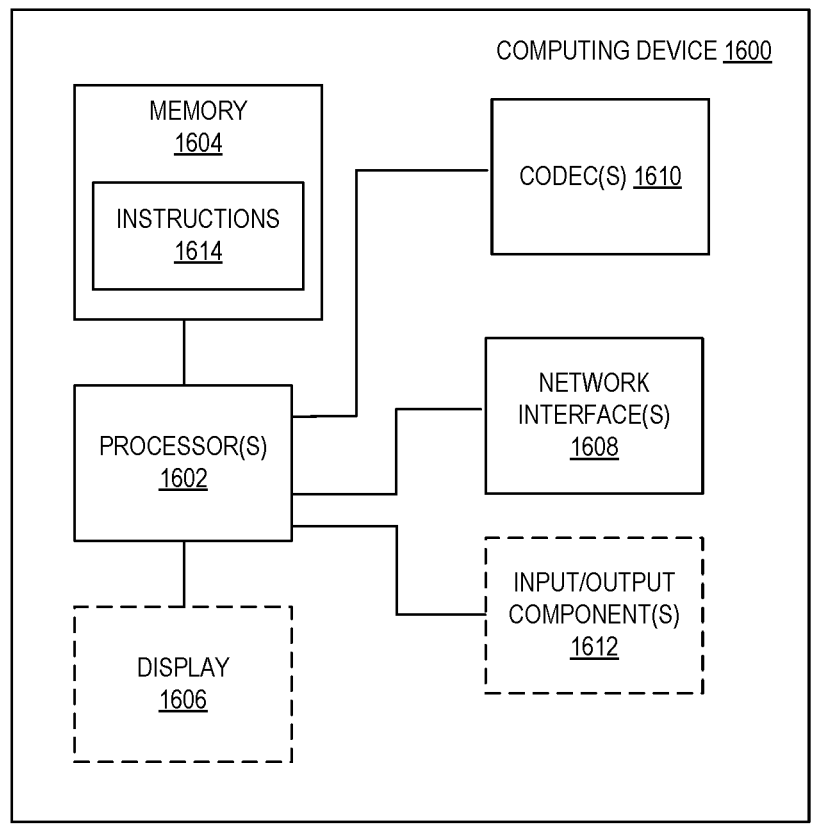
FIG. 16 illustrates a logical arrangement of a set of general components of an exemplary computing device that can be utilized in accordance with various embodiments.
Figure 17:
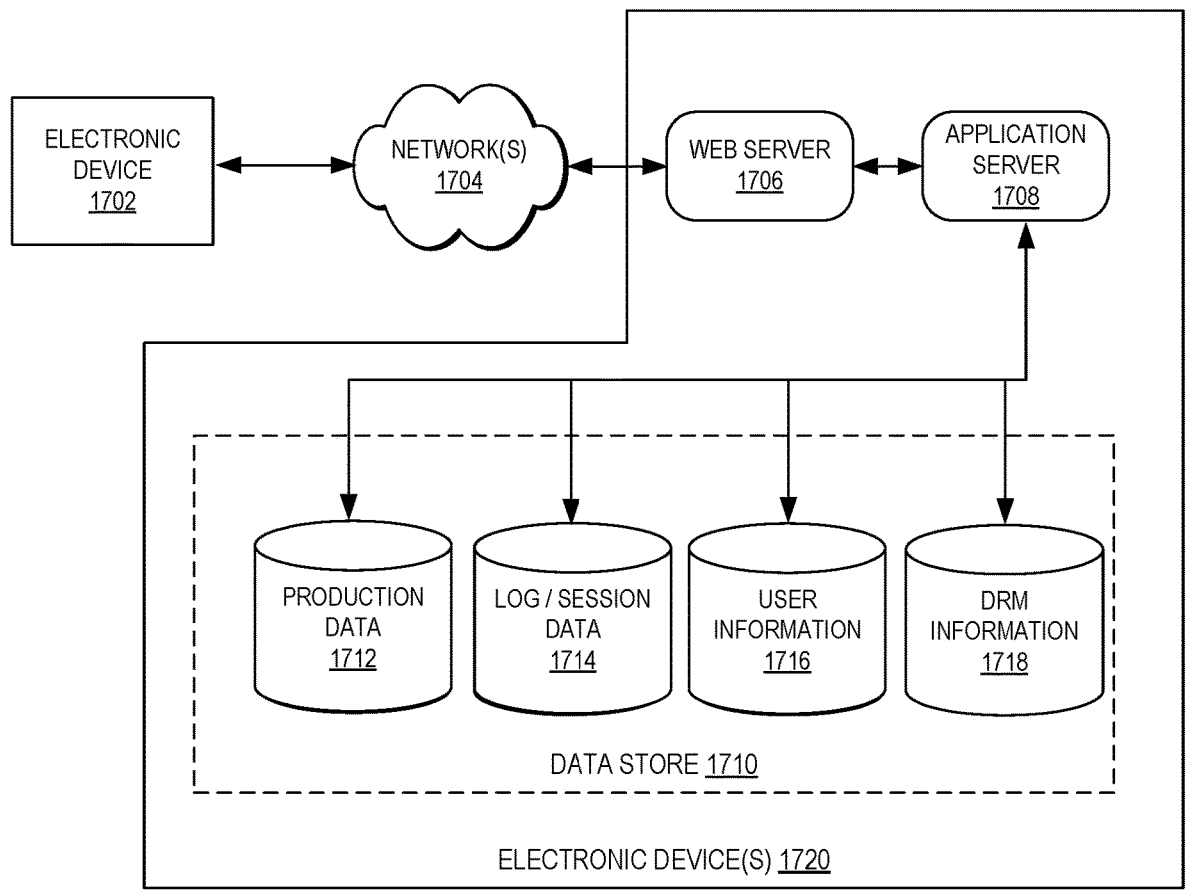
FIG. 17 illustrates an example of an environment for implementing aspects in accordance with various embodiments.

In one embodiment, front end media player 204 receives a request from a user for a device (e.g., electronic device(s) 1560 in FIG. 15, computing device 1600 in FIG. 16 or electronic device 1702 in FIG. 17) that includes media rendering system 202 to play that media. In the depicted embodiment, front end media player 204 is to access that media, e.g., from content data store 208. The depicted components (e.g., DRM session manager 212, media rendering engine 214, media feed 216) may then be used to allow the front end media player 204 to cause access units of media to be rendered (e.g., by fragment media renderer 218) for playing, e.g., by device that includes video display 220 and audio playback circuitry 222 (e.g., speakers).

More particularly, media rendering engine 214 (e.g., media rendering engine) receives a request to play (e.g., or pause, seek, stop, or other playback control request) media (e.g., including audio and video) from front end media player 204. The front end media player 204 is also to push access units (e.g., audio access units and video access units) for playback. In the depicted embodiment, a single media feed 216 (e.g., access unit media feed) is depicted. In another embodiment, a second media feed is included, for example, as shown in FIG. 1 with audio access units 108 stored in media feed 112 for audio and video access units 110 stored in media feed 114 for video. Thus, the depicted instance of sample stream 224, sample queue 226, and sample metadata queue 228 may be used for video access units, and a second instance of each of sample stream 224, sample queue 226, and sample metadata queue 228 may be included to for audio access units (e.g., with a single instance of media feed 216 for each instance of the duplicated components). Further, DRM session manager 212 (e.g., as an instance of DRM session manager 402 in FIG. 4) is included to play encrypted media.

In certain embodiments, the access unit feed (e.g., audio access unit feed and video access unit feed), playback control feed (e.g. play, pause, seek, or stop), and DRM session manager 212 proceeds independent of the other feeds to avoid bottlenecks.

In the depicted embodiment, media feed 216 receives the access units of media and forwards them to a sample stream 224 for storage. In one embodiment, sample stream 224 manages control of the access units (and its corresponding metadata), for example, by controlling the read and write of the access units to sample queue 226 and their corresponding metadata to sample metadata queue 228. In one embodiment, sample queue 226 is an instance of sample queue 304 from FIG. 3 and sample metadata queue 228 is an instance of sample metadata queue 306 from FIG. 3. In one embodiment, metadata includes information that indicates when to display a video portion (e.g., frame) and/or encryption information.

Certain embodiments herein remove the control of downloading media (e.g., from content data store 208) from a fragment media player 206 but retain the rendering functionality of renderer 218 of the fragment media player 206.

As one example of initializing the media rendering system 202 for use, the media rendering engine 214 is coupled to fragment media player 206, e.g., to send the fragment media player 206 playback control (e.g. play, pause, seek, or stop). In this example, load monitor 230 monitors the amount of data written to memory (e.g., the memory used by sample queue 226 and sample metadata queue 228). In this example, load control 232 manages the flow access units that are sent to renderer 218. In one embodiment, the load monitor (e.g., periodically) queries (e.g., via the fragment media player's internal messaging system) the load control 232 to determine if the fragment player has a desired amount of data (e.g., between a minimum threshold and maximum threshold). In one embodiment, there is one load monitor for all feeds to account for various feed speeds. If the load control 232 indicates (e.g., via the fragment media player's internal messaging system) that it has a desired amount of data, load control 232 may send (e.g., via the fragment media player's internal messaging system) a corresponding indication to the load monitor 230, e.g., to cause the load monitor to control (e.g., stop) the loading of data via media feed 216 into sample stream 224 (e.g., its sample queue 226 and sample metadata queue 228). If the load control 232 indicates (e.g., via the fragment media player's internal messaging system) that it has less than a desired amount of data, load control 232 may send (e.g., via the fragment media player's internal messaging system) a corresponding indication to the load monitor 230, e.g., to cause the load monitor to control (e.g., begin or increase the rate of) the loading of data via media feed 216 into sample stream 224 (e.g., its sample queue 226 and sample metadata queue 228). In one embodiment, each media feed (e.g., audio or video) queries the load control 232 via the fragment media player's internal messaging system (e.g., message bus) on whether they should continue loading access units or not to ensure that the fragment media player does not overuse memory. In one embodiment, load monitor 230 and load control 232 are combined into one component that controls the data flow into the media feeds, e.g., when the fragment media player's internal messaging system is not available for utilization by the media rendering engine 214.

In one embodiment, to play a piece of media, media source 234 is created and passed as an object that represents the piece of media (e.g., the access units that are being sent by front end media player 204) to the fragment media player 206.

In one embodiment, media period 236 stores the period of the played content. In one embodiment, media period 236 creates and configures the sample stream(s) and passes them to the fragment media player (e.g., the renderer thereof). In certain embodiments, the media period 236 is a part of media source 234.

In a loading example, load monitor 230 has determined via load control 232 that the fragment media player 206 (e.g., the renderer 218 thereof) is to load more data, so load monitor 230 causes media feed 216 to store additional access unit(s) of media into sample queue 226 (e.g., as sample data and to store the associated metadata into sample metadata queue 228 (e.g., as sample metadata).

In a rendering example, renderer 218 reads access unit(s) of media (e.g., audio sample or encoded video frames) from sample queue 226 and the associated metadata from sample metadata queue 228. In this example, the rendering (e.g., via the codecs of the renderer 218 of fragment media player and not a codec of the front end media player) is performed and the rendered media is sent to an output buffer 238. In the depicted embodiment, the decoded media (e.g., audio or video) is sent to the operating system's media application programming interface (API) 240 (e.g., from software development kit (SDK)) for rendering. The media API then sends the media to a device for playback via its video display 220 and audio playback circuitry 222 (e.g., speakers).

DRM session manager 212 may be included for use with encrypted media. In certain embodiments, DRM session manager 212 obtains a DRM license (e.g., key(s)) from a DRM server (e.g., DRM information 1718 in data store 1710 in FIG. 17) via the front end media player 204. In one embodiment, the DRM session manager binds the license to a specific media (e.g., via the operating system's APIs). In one embodiment, this license is then used by the fragment media player 206 to decrypt the encrypted access units (e.g., via the hardware secure codec). A further example of a DRM session manager is discussed in reference to FIG. 4 below.

Figure 3:
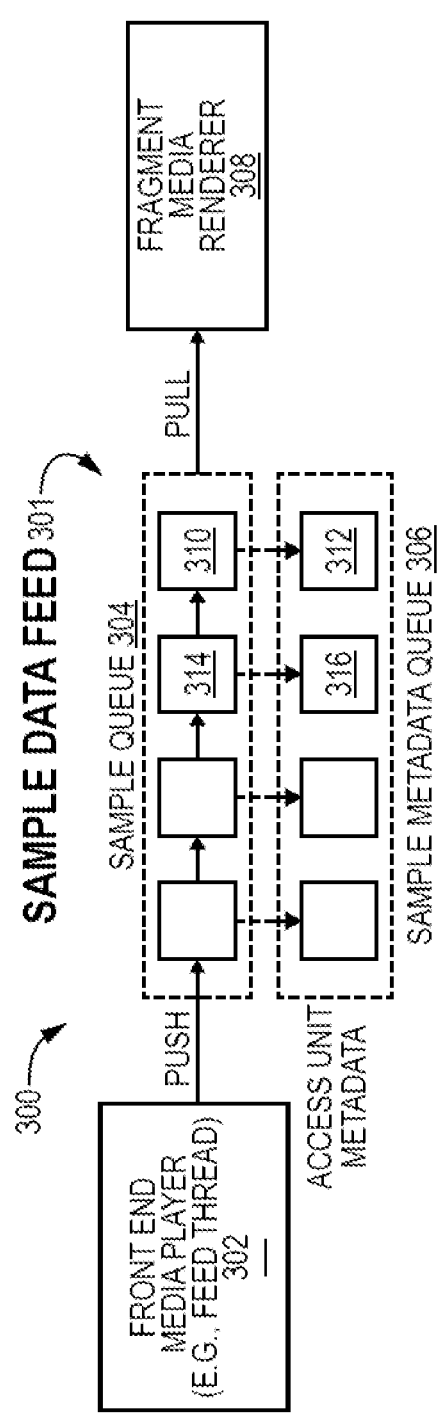
FIG. 3 is a diagram illustrating a way to adapt different data flow models according to some embodiments.

FIG. 3 is a diagram illustrating a way to adapt different data flow models 300 according to some embodiments. As noted above, in certain embodiments, a front end media player only operates according to a push data flow model and a fragment media player only operates according to a pull data flow model. Thus, FIG. 3 illustrates the use of an intermediate queue (e.g., buffer) to cache access units of media. In one embodiment, sample metadata queue 306 is thread safe (e.g., ensuring that the encrypted access units are always corresponding to their metadata in read and write), and it is the one that keeps track of the sample queue 304 state. As one example, front end media player 302 (e.g., a feed thread thereof) sends access unit 310 to queue 304 and the associated metadata 312 to metadata queue 306, and then sends access unit 314 to queue 304 and the associated metadata 316 to metadata queue 306 (e.g., forming data feed 301). The fragment media renderer 308 may then pull the data (e.g., access unit 310 and access unit 314 along with respective metadata 312 and metadata 316) and render that data. In certain embodiments, the metadata queue 306 allows the synchronization of metadata with corresponding access unit stored in queue 304. In one embodiment, the metadata includes the DRM license information (e.g., key) for that particular access unit. Although four sets of access units are shown along with their respective metadata, it should be understood that any plurality of data access units may be stored in an appropriately sized queue.

Figure 4:
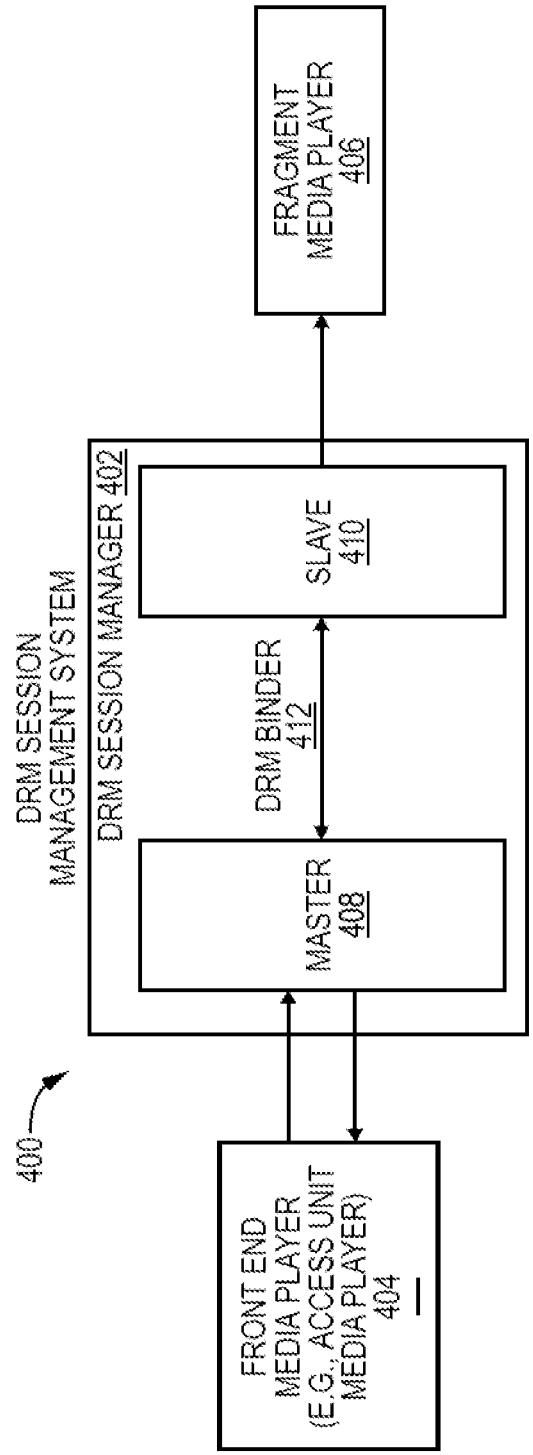
FIG. 4 is a diagram illustrating a digital rights management (DRM) session management system according to some embodiments.

FIG. 4 is a diagram illustrating a digital rights management (DRM) session management system 400 according to some embodiments. In some embodiment, to successfully enable a player to play encrypted media, a DRM workflow is incorporated. In certain embodiments, a fragment level media player gets a manifest containing the necessary information to request and bind a DRM license to the media, but this is not the case for a front end media player. In this embodiment, the front end media player is to obtain the DRM license (e.g., keys) required for decrypting the content. In certain embodiments, a fragment level media player requests a DRM license and fragments of media in parallel and does not start playback until the license is bound. This may be a critical problem for some players because they delay the data feed until the license is bound. To overcome these issues, certain embodiments herein utilize a DRM session management system. Depicted DRM session management system 400 includes a DRM session manager 402 coupled between a front end media player 404 and a fragment media player 406. Depicted DRM session manager 402 includes a master session manager 408 and a slave session manager 410. Note that a two-headed arrow may indicate two-way communication and a one headed arrow may indicate one-way communication. In certain embodiments, the slave session manager 410 is injected into a fragment media player, e.g., where the slave session manager 410 conforms to a DRM session manager interface to mimic the master session manager's 408 APIs. In the depicted embodiment, a DRM binder interface 412 binds the slave 410 with the master 408. In one embodiment, when the fragment media player 406 requests any DRM information from the slave session manager 410, the slave session manager 410 queries the master session manager 408 to provide it. This approach maintains a clean way of exposing the DRM instances between the front end media player and fragment media player. In the depicted embodiment, the slave session manager 410 is in one-way communication with the fragment media player 406.

Figure 5:
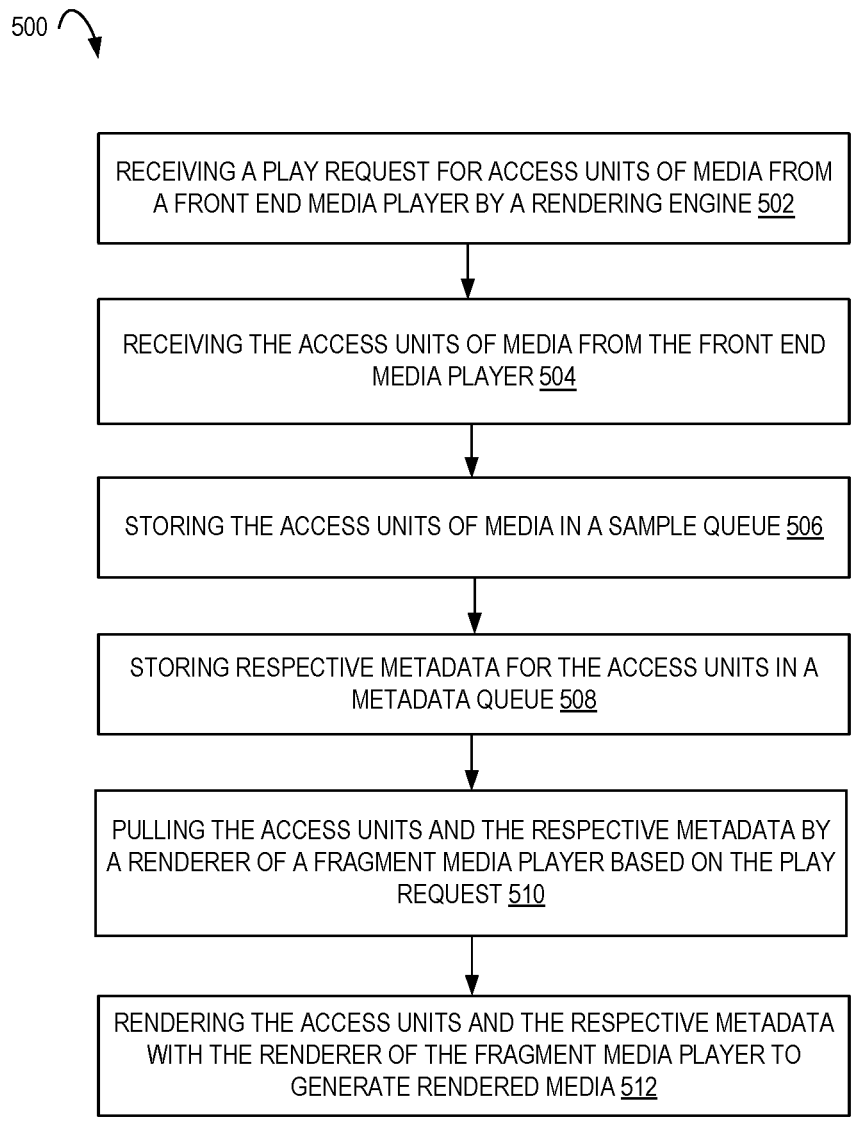
FIG. 5 is a flow diagram illustrating operations of a method for rendering access units of media with a renderer of a fragment media player according to some embodiments.

FIG. 5 is a flow diagram 500 illustrating operations of a method for rendering access units of media with a renderer of a fragment media player according to some embodiments. Depicted flow diagram 500 includes receiving a play request for access units of media from a front end media player by a rendering engine 502, receiving the access units of media from the front end media player 504, storing the access units of media in a sample queue 506, storing respective metadata for the access units in a metadata queue 508, pulling the access units and the respective metadata by a renderer of a fragment media player based on the play request 510 (e.g., and/or based on the codec buffer capacity), and rendering the access units and the respective metadata with the renderer of the fragment media player to generate rendered media 512.

In certain embodiments, a media pipeline backend engine (e.g., a media rendering engine) is utilized to initialize a media rendering system (e.g., via the fragment media player or directly). For example, in reference to FIG. 2, the following calls may be sent between the corresponding components.

FIG. 6 is a diagram illustrating an initialization of a media rendering system according to some embodiments. In the depicted embodiment, front end media player 602 (e.g., a media pipeline internal to a device) sends an initialization call to media pipeline backend engine 604 (e.g., a media rendering engine). The media pipeline backend engine 604 creates renderer 606, e.g., renderer 218 in FIG. 2. The media pipeline backend engine 604 creates load control 608, e.g., load control 232 in FIG. 2. The media pipeline backend engine 604 creates media (e.g., data) feed 610, e.g., media feed 216 in FIG. 2.

In one embodiment, the media pipeline backend engine 604 initializes media feed 610 (e.g., media feeds in FIG. 1) and attaches them to the initialized renderer(s). In one embodiment, on receiving metadata, media pipeline backend engine 604 configures the media feed (e.g., sample stream(s)) with the input format and the renderer(s) with DRM initialization data, e.g., where the configured formats are read by the renderers at a later point in time. This initialization prepares the components for any upcoming control events (e.g., play, pause, seek, or stop) in certain embodiments. In one embodiment, for a data event (e.g., onAudioAccessUnit or onVideoAccessUnit), the access unit of media is passed by the media feed to its respective sample stream (e.g., media feeds in FIG. 1). In one embodiment, control events are directed to the sample stream(s) to control the states of the sample queue and sample metadata queue (e.g., as in FIG. 2 or FIG. 3). Media pipeline backend engine handles the control events in regard to the renderer(s).

FIG. 7 is a diagram illustrating decoder configuration of a media rendering system according to some embodiments. In one embodiment, the depicted calls are made at the beginning of playback to configure the decoders (e.g., with the mime type, sequence parameter set (SPS), and picture parameter set (PPS)), for example, with these calls made once per playback session. In the depicted embodiment, front end media player 702 (e.g., a media pipeline internal to a device) sends metadata to media pipeline backend engine 704 (e.g., a media rendering engine). The media pipeline backend engine 704 configures the format, and creates (e.g., based on the format and the media feeds) media source 706, e.g., media source 234 in FIG. 2. In one embodiment, the media pipeline backend engine 704 passes the media source 706 to the fragment media player 708, e.g., fragment media player 206 in FIG. 2. In another embodiment, the media pipeline backend engine 704 enables a renderer of the fragment media player 708, e.g., renderer 218 in FIG. 2.

Figure 8:
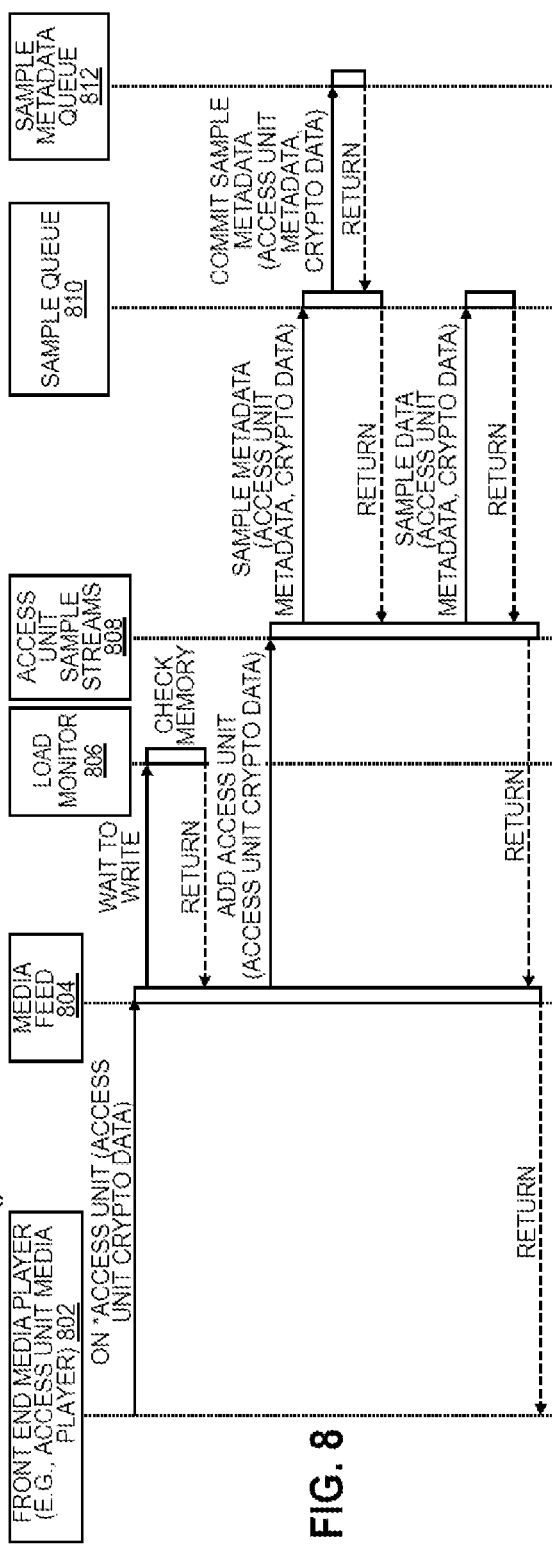
FIG. 8 is a diagram illustrating receipt of an access unit by a media rendering system according to some embodiments.

FIG. 8 is a diagram illustrating receipt of an access unit by a media rendering system according to some embodiments. In one embodiment, the depicted calls are made upon receipt of each access unit. Note that in certain embodiments, the access unit metadata is not the same as the stream metadata (e.g., isParameterSet, width, height, and bitrate). In the depicted embodiment, front end media player 802 sends an access unit of media (e.g., and its metadata, which may include cryptographic data) to media feed 804. The media feed 804 sends a wait to write command to the load monitor 806, e.g., load monitor 230 in FIG. 2. In the depicted embodiment, the load monitor 806 checks the memory, for example, and returns an indication of memory space being available. The media feed 804 sends the received access unit of media to be added into sample stream 808. The sample stream 808 sends the access unit and its metadata to sample queue 810 (e.g., sample queue 226 in FIG. 2) and sample metadata queue 812 (e.g., sample metadata queue 228 in FIG. 3), respectively.

Figure 9:
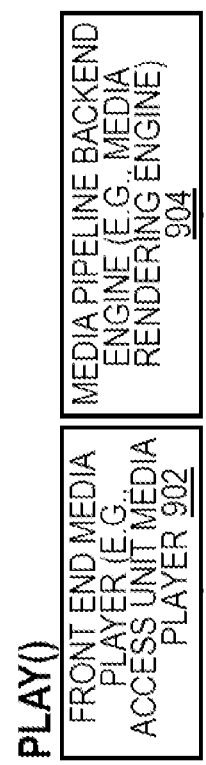
FIG. 9 is a diagram illustrating a play request for a media rendering system according to some embodiments.

FIG. 9 is a diagram illustrating a play request for a media rendering system according to some embodiments. In the depicted embodiment, front end media player 902 sends a play request to media pipeline backend engine 904 (e.g., a media rendering engine). The media pipeline backend engine 904 sends a play command to the fragment media player 906 which reads the data (e.g., access units) from the injected sample streams.

Figure 10:
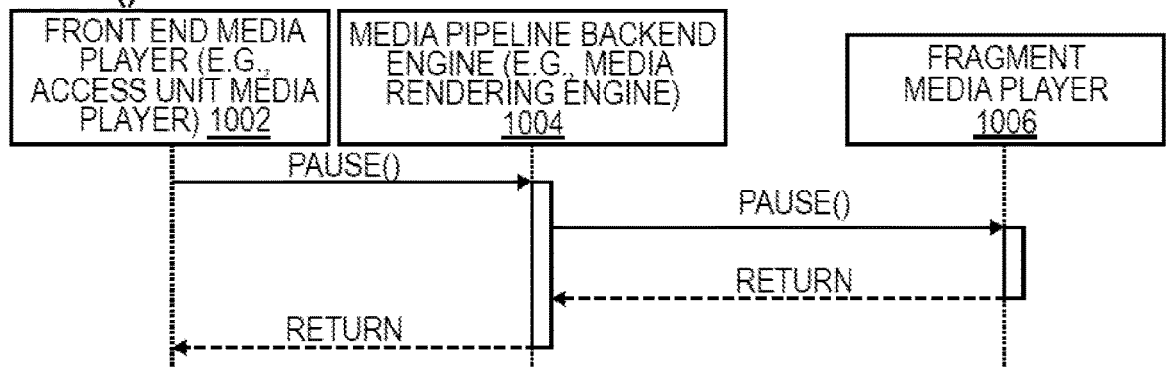
FIG. 10 is a diagram illustrating a pause request for a media rendering system according to some embodiments.

FIG. 10 is a diagram illustrating a pause request for a media rendering system according to some embodiments. In the depicted embodiment, front end media player 1002 sends a pause request to media pipeline backend engine 1004 (e.g., a media rendering engine). The media pipeline backend engine 1004 sends a pause command to the fragment media player 1006. In one embodiment, the media pipeline backend engine 1004 stops the renderers. IN one embodiment, the media pipeline backend engine 1004 resets the rendering position (e.g., indication of progress) to the current position when paused.

Figure 11:
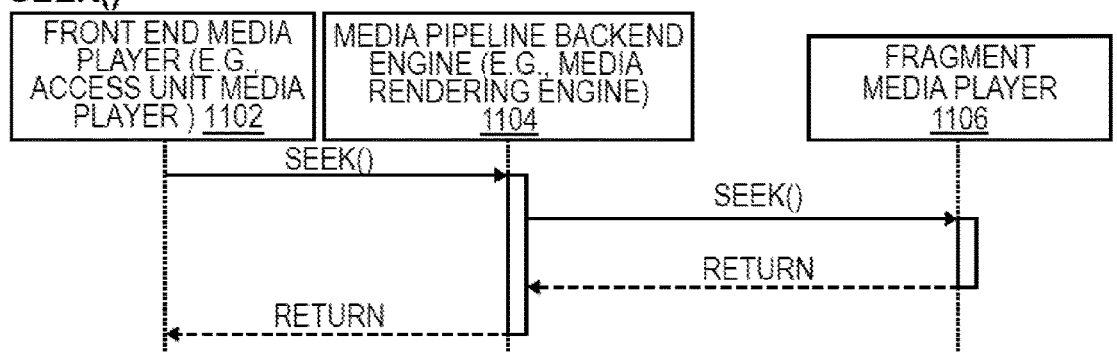
FIG. 11 is a diagram illustrating a seek request for a media rendering system according to some embodiments.

FIG. 11 is a diagram illustrating a seek request for a media rendering system according to some embodiments. In the depicted embodiment, front end media player 1102 sends a seek request (for example, for a particular time within media, e.g., nine minutes and six seconds into the media) to media pipeline backend engine 1104 (e.g., a media rendering engine). The media pipeline backend engine 1104 sends a seek command to the fragment media player 1106. In one embodiment, the media pipeline backend engine stops the media feeds, then it sends a "seek" signal to the fragment media player, the engine may have to wait for the fragment to fully process the seek operation, and next, it updates the engine's internal position to the new seek position. In one embodiment, the media pipeline backend engine 1004 sends a stop command to a renderer of the fragment media player 1106 to stop rendering of the media (e.g., access units). In certain embodiments, the media pipeline backend engine 1004 adjusts the clock position (e.g., with the particular time being sought within the media). In one embodiment, the media pipeline backend engine 1004 sends a seek command to a sample stream of fragment media player 1106 for that clock position, e.g., and the media pipeline backend engine 1104 resets the rendering position (e.g., indication of progress) to that clock position being sought.

Figure 12:
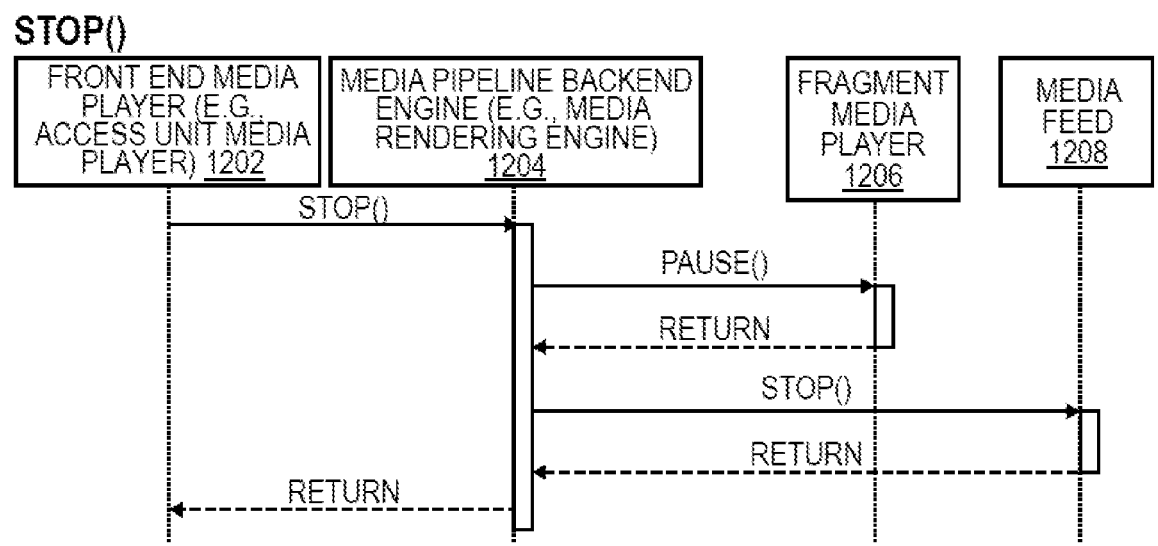
FIG. 12 is a diagram illustrating a stop request for a media rendering system according to some embodiments.

FIG. 12 is a diagram illustrating a stop request for a media rendering system according to some embodiments. In the depicted embodiment, front end media player 1202 sends a stop request to media pipeline backend engine 1204 (e.g., a media rendering engine). The media pipeline backend engine 1204 sends a pause command to the fragment media player 1206 and a stop command to the media feed 1208. In one embodiment, the media pipeline backend engine 1204 sends a pause command to a renderer of the fragment media player 1206 to pause rendering of the media (e.g., access units).

At least some embodiments of the disclosed technologies can be described in view of the following examples:

Example 1. A computer-implemented method comprising:
receiving a play (e.g., rendering) request for access units of media from a front end media player by a rendering engine;
receiving the access units of media from the front end media player by a sample stream component of a fragment media player;
storing the access units of media in a sample queue of the sample stream component;
storing respective metadata for the access units in a metadata queue of the sample stream component;
pulling the access units and the respective metadata by a renderer of the fragment media player based on the play request; and
rendering the access units and the respective metadata with the renderer of the fragment media player to generate rendered media.

Example 2. The computer-implemented method of example 1, further comprising controlling an amount of access units of media stored in the sample queue by causing a load monitor component to query a load control component via a message bus of the fragment media player.

Example 3. The computer-implemented method of example 1, further comprising splitting the access units of media into audio data and video data, wherein the storing the access units of media in the sample queue comprises storing the audio data in an audio sample queue and storing the video data in a video sample queue.

Example 4. A computer-implemented method comprising:
receiving a play request for access units of media from a front end media player by a rendering engine;
receiving the access units of media from the front end media player;
storing the access units of media in a sample queue;
storing respective metadata for the access units in a metadata queue;
pulling the access units and the respective metadata by a renderer of a fragment media player based on the play request; and
rendering the access units and the respective metadata with the renderer of the fragment media player to generate rendered media.

Example 5. The computer-implemented method of example 4, further comprising controlling an amount of access units of media stored in the sample queue by causing a load monitor component to query a load control component via a message bus of the fragment media player.

Example 6. The computer-implemented method of example 4, further comprising splitting the access units of media into audio data and video data, wherein the storing the access units of media in the sample queue comprises storing the audio data in an audio sample queue and storing the video data in a video sample queue.

Example 7. The computer-implemented method of example 4, further comprising:
a digital rights management (DRM) session manager obtaining a DRM license from a DRM server via the front end media player for the access units of media, binding the DRM license to the access units of media to generate a bound DRM license for the access units, and sending the bound DRM license for the access units to the fragment media player; and
decrypting the access units of media with the bound DRM license by the fragment media player.

Example 8. The computer-implemented method of example 7, wherein the DRM session manager comprises a master session manager coupled to the front end media player, a slave session manager coupled to the fragment media player, and a DRM binder between the master session manager and the slave session manager.

Example 9. The computer-implemented method of example 8, wherein the slave session manager is in one-way communication to the fragment media player.

Example 10. The computer-implemented method of example 4, wherein the play request does not block the receiving of the access units of media from the front end media player.

Example 11. The computer-implemented method of example 4, wherein the rendering comprises the fragment media player decoding the access units with the respective metadata and a codec of the fragment media player.

Example 12. The computer-implemented method of example 4, further comprising registering a load monitor component to a media feed comprising the sample queue and the metadata queue by a media period component.

Example 13. The computer-implemented method of example 4, further comprising loading the access units from a content data store by the front end media player.

Example 14. The computer-implemented method of example 4, further comprising sending the rendered media to a device for playback.

Example 15. A system comprising:
a content data store to store access units of media; and
a media rendering service implemented by a one or more electronic devices, the media rendering service including instructions that upon execution cause the one or more electronic devices to:
receive a play request for the access units of media from a front end media player by a rendering engine;
receive the access units of media from the front end media player;
store the access units of media in a sample queue;
store respective metadata for the access units in a metadata queue;
pull the access units and the respective metadata by a renderer of a fragment media player based on the play request; and
render the access units and the respective metadata with the renderer of the fragment media player to generate rendered media.

Example 16. The system of example 15, wherein the media rendering service further includes instructions that upon execution cause the one or more electronic devices to: control an amount of access units of media stored in the sample queue by causing a load monitor component to query a load control component via a message bus of the fragment media player.

Example 17. The system of example 15, wherein the media rendering service further includes instructions that upon execution cause the one or more electronic devices to: split the access units of media into audio data and video data, wherein the store of the access units of media in the sample queue comprises storing the audio data in an audio sample queue and storing the video data in a video sample queue.

Example 18. The system of example 15, wherein the media rendering service further includes instructions that upon execution cause the one or more electronic devices to: obtain a digital rights management (DRM) DRM license from a DRM server via the front end media player for the access units of media, bind the DRM license to the access units of media to generate a bound DRM license and access units, send the bound DRM license and access units to the fragment media player by a DRM session manager, and decrypt the access units of media with the bound DRM license by the fragment media player.

Example 19. The system of example 15, wherein the render comprises the fragment media player decoding the access units with the respective metadata and a codec of the fragment media player.

Example 20. The system of example 15, wherein the media rendering service further includes instructions that upon execution cause the one or more electronic devices to: load the access units from the content data store by the front end media player.

Figure 13:
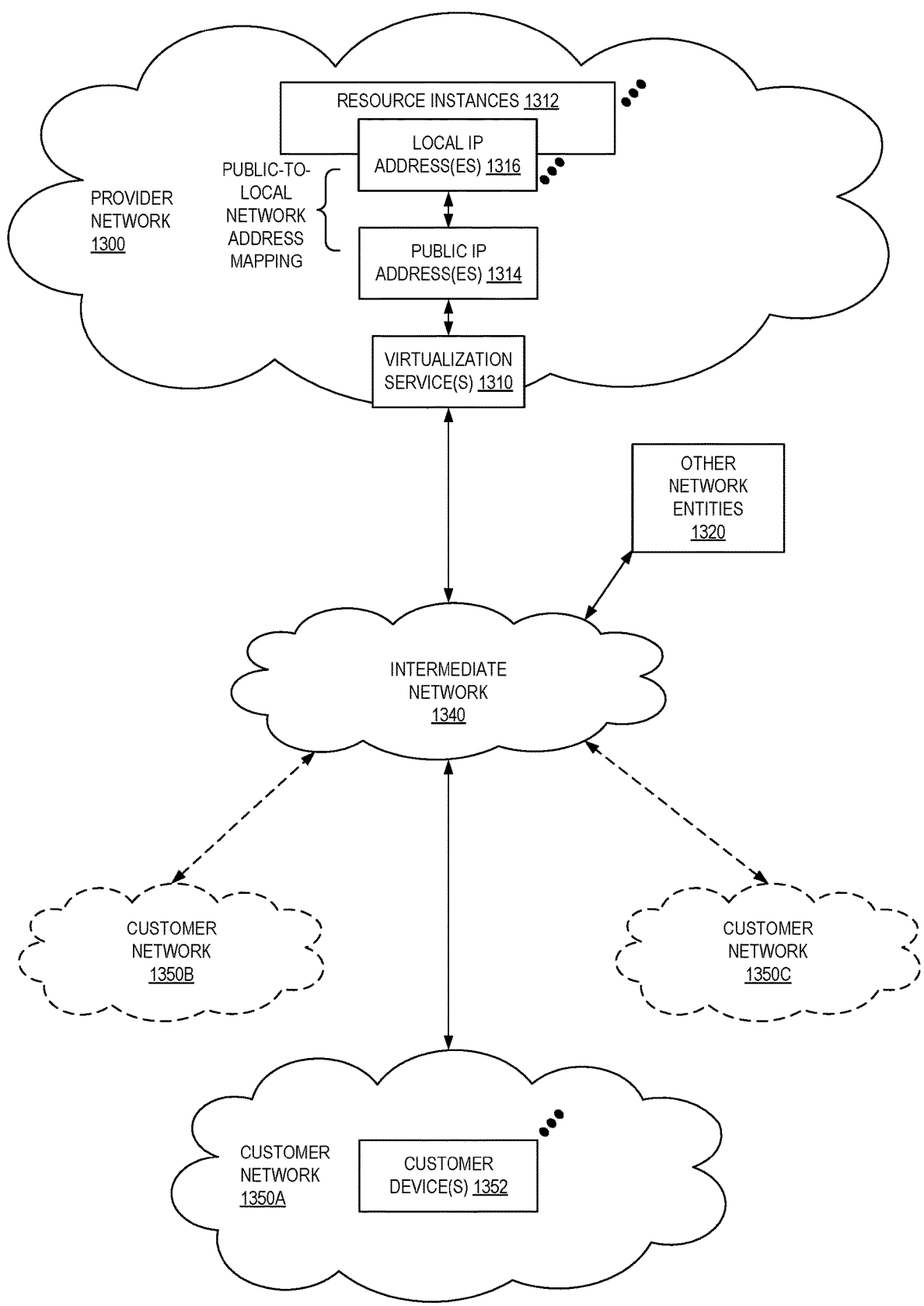
FIG. 13 illustrates an example provider network environment according to some embodiments.

FIG. 13 illustrates an example provider network (or "service provider system") environment according to some embodiments. A provider network 1300 may provide resource virtualization to customers via one or more virtualization services 1310 that allow customers to purchase, rent, or otherwise obtain instances 1312 of virtualized resources, including but not limited to computation and storage resources, implemented on devices within the provider network or networks in one or more data centers. Local Internet Protocol (IP) addresses 1316 may be associated with the resource instances 1312; the local IP addresses are the internal network addresses of the resource instances 1312 on the provider network 1300. In some embodiments, the provider network 1300 may also provide public IP addresses 1314 and/or public IP address ranges (e.g., Internet Protocol version 4 (IPv4) or Internet Protocol version 6 (IPv6) addresses) that customers may obtain from the provider 1300.

Conventionally, the provider network 1300, via the virtualization services 1310, may allow a customer of the service provider (e.g., a customer that operates one or more client networks 1350A-1350C including one or more customer device(s) 1352) to dynamically associate at least some public IP addresses 1314 assigned or allocated to the customer with particular resource instances 1312 assigned to the customer. The provider network 1300 may also allow the customer to remap a public IP address 1314, previously mapped to one virtualized computing resource instance 1312 allocated to the customer, to another virtualized computing resource instance 1312 that is also allocated to the customer. Using the virtualized computing resource instances 1312 and public IP addresses 1314 provided by the service provider, a customer of the service provider such as the operator of customer network(s) 1350A-1350C may, for example, implement customer-specific applications and present the customer's applications on an intermediate network 1340, such as the Internet. Other network entities 1320 on the intermediate network 1340 may then generate traffic to a destination public IP address 1314 published by the customer network(s) 1350A-1350C; the traffic is routed to the service provider data center, and at the data center is routed, via a network substrate, to the local IP address 1316 of the virtualized computing resource instance 1312 currently mapped to the destination public IP address 1314. Similarly, response traffic from the virtualized computing resource instance 1312 may be routed via the network substrate back onto the intermediate network 1340 to the source entity 1320.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via I:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1300; a customer may then assign their allocated public IP addresses to particular resource instances allocated to the customer. These public IP addresses may be referred to as customer public IP addresses, or simply customer IP addresses. Instead of being assigned by the provider network 1300 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 14:
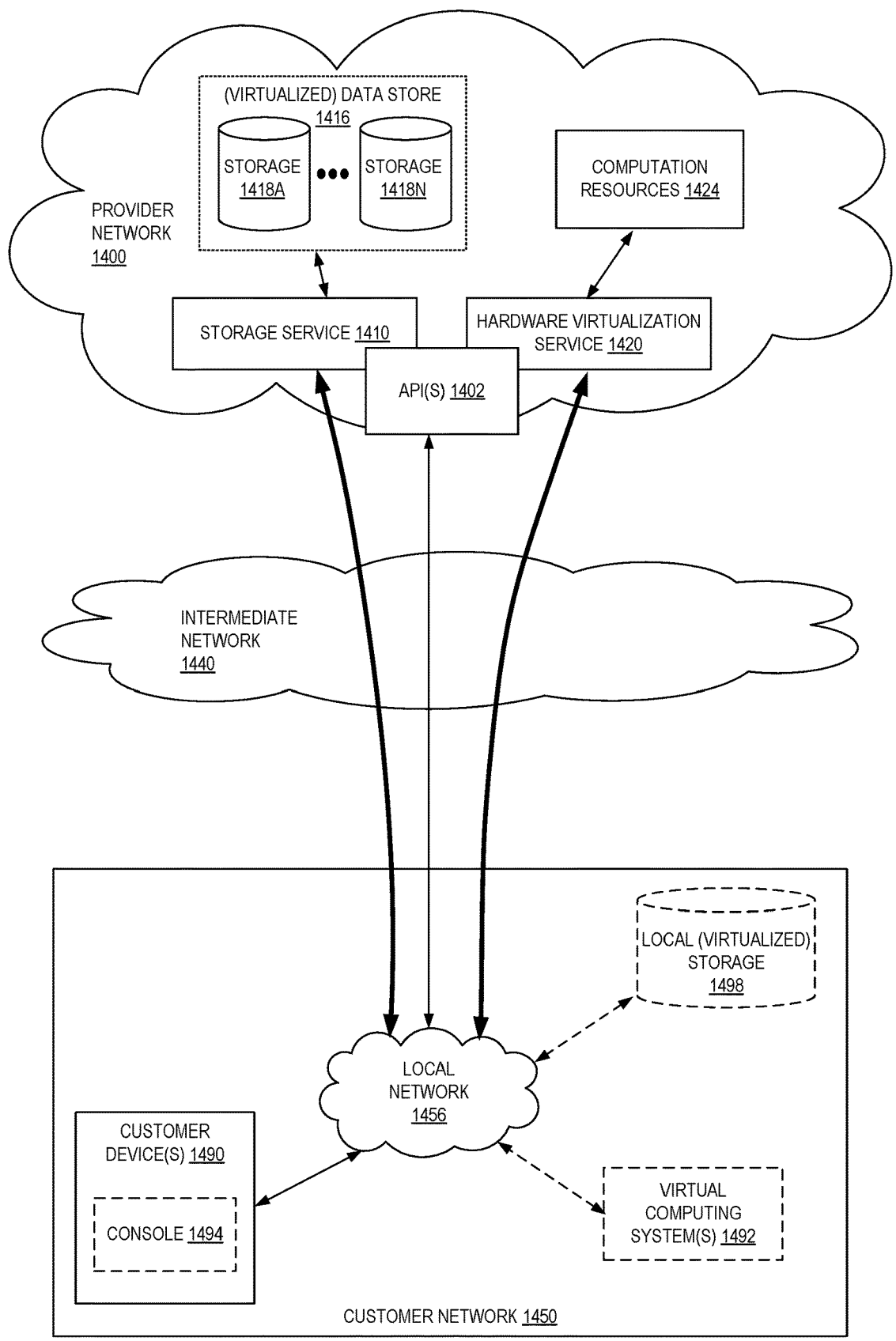
FIG. 14 is a block diagram of an example provider network that provides a storage service and a hardware virtualization service to customers according to some embodiments.

FIG. 14 is a block diagram of an example provider network that provides a storage service and a hardware virtualization service to customers, according to some embodiments. Hardware virtualization service 1420 provides multiple computation resources 1424 (e.g., VMs) to customers. The computation resources 1424 may, for example, be rented or leased to customers of the provider network 1400 (e.g., to a customer that implements customer network 1450). Each computation resource 1424 may be provided with one or more local IP addresses. Provider network 1400 may be configured to route packets from the local IP addresses of the computation resources 1424 to public Internet destinations, and from public Internet sources to the local IP addresses of computation resources 1424.

Provider network 1400 may provide a customer network 1450, for example coupled to intermediate network 1440 via local network 1456, the ability to implement virtual computing systems 1492 via hardware virtualization service 1420 coupled to intermediate network 1440 and to provider network 1400. In some embodiments, hardware virtualization service 1420 may provide one or more APIs 1402, for example a web services interface, via which a customer network 1450 may access functionality provided by the hardware virtualization service 1420, for example via a console 1494 (e.g., a web-based application, standalone application, mobile application, etc.). In some embodiments, at the provider network 1400, each virtual computing system 1492 at customer network 1450 may correspond to a computation resource 1424 that is leased, rented, or otherwise provided to customer network 1450.

From an instance of a virtual computing system 1492 and/or another customer device 1490 (e.g., via console 1494), the customer may access the functionality of storage service 1410, for example via one or more APIs 1402, to access data from and store data to storage resources 1418A-1418N of a virtual data store 1416 (e.g., a folder or "bucket", a virtualized volume, a database, etc.) provided by the provider network 1400. In some embodiments, a virtualized data store gateway (not shown) may be provided at the customer network 1450 that may locally cache at least some data, for example frequently-accessed or critical data, and that may communicate with storage service 1410 via one or more communications channels to upload new or modified data from a local cache so that the primary store of data (virtualized data store 1416) is maintained. In some embodiments, a user, via a virtual computing system 1492 and/or on another customer device 1490, may mount and access virtual data store 1416 volumes via storage service 1410 acting as a storage virtualization service, and these volumes may appear to the user as local (virtualized) storage 1498.

While not shown in FIG. 14, the virtualization service(s) may also be accessed from resource instances within the provider network 1400 via API(s) 1402. For example, a customer, appliance service provider, or other entity may access a virtualization service from within a respective virtual network on the provider network 1400 via an API 1402 to request allocation of one or more resource instances within the virtual network or within another virtual network.

Illustrative System

In some embodiments, a system that implements a portion or all of the techniques for transforming a fragment media player into an access unit media player as described herein may include a general-purpose computer system that includes or is configured to access one or more computer-accessible media, such as computer system 1500 illustrated in FIG. 15. In the illustrated embodiment, computer system 1500 includes one or more processors 1510 coupled to a system memory 1520 via an input/output (I/O) interface 1530. Computer system 1500 further includes a network interface 1540 coupled to I/O interface 1530. While FIG. 15 shows computer system 1500 as a single computing device, in various embodiments a computer system 1500 may include one computing device or any number of computing devices configured to work together as a single computer system 1500.

In various embodiments, computer system 1500 may be a uniprocessor system including one processor 1510, or a multiprocessor system including several processors 1510 (e.g., two, four, eight, or another suitable number). Processors 1510 may be any suitable processors capable of executing instructions. For example, in various embodiments, processors 1510 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1510 may commonly, but not necessarily, implement the same ISA.

System memory 1520 may store instructions and data accessible by processor(s) 1510. In various embodiments, system memory 1520 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1520 as code 1525 and data 1526.

In one embodiment, I/O interface 1530 may be configured to coordinate I/O traffic between processor 1510, system memory 1520, and any peripheral devices in the device, including network interface 1540 or other peripheral interfaces. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processor 1510.

Network interface 1540 may be configured to allow data to be exchanged between computer system 1500 and other devices 1560 attached to a network or networks 1550, such as other computer systems or devices as illustrated in FIG. 1, for example. In various embodiments, network interface 1540 may support communication via any suitable wired or wireless general data networks, such as types of Ethernet network, for example. Additionally, network interface 1540 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1500 includes one or more offload cards 1570 (including one or more processors 1575, and possibly including the one or more network interfaces 1540) that are connected using an I/O interface 1530 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1500 may act as a host electronic device (e.g., operating as part of a hardware virtualization service) that hosts compute instances, and the one or more offload cards 1570 execute a virtualization manager that can manage compute instances that execute on the host electronic device. As an example, in some embodiments the offload card(s) 1570 can perform compute instance management operations such as pausing and/or un-pausing compute instances, launching and/or terminating compute instances, performing memory transfer/copying operations, etc. These management operations may, in some embodiments, be performed by the offload card(s) 1570 in coordination with a hypervisor (e.g., upon a request from a hypervisor) that is executed by the other processors 1510A-1510N of the computer system 1500. However, in some embodiments the virtualization manager implemented by the offload card(s) 1570 can accommodate requests from other entities (e.g., from compute instances themselves), and may not coordinate with (or service) any separate hypervisor.

In some embodiments, system memory 1520 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1500 via I/O interface 1530. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1500 as system memory 1520 or another type of memory. Further, a computer-accessible medium may include transmission media or signals such as electrical, electromagnetic, or digital signals, conveyed via a communication medium such as a network and/or a wireless link, such as may be implemented via network interface 1540.

FIG. 16 illustrates a logical arrangement of a set of general components of an example computing device 1600 such as device discussed in reference to FIGS. 1-12, etc. Generally, a computing device 1600 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1602 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1604) to store code (e.g., instructions 1614) and/or data, and a set of one or more wired or wireless network interfaces 1608 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1604) of a given electronic device typically stores code (e.g., instructions 1614) for execution on the set of one or more processors 1602 of that electronic device. One or more parts of various embodiments may be implemented using different combinations of software, firmware, and/or hardware.

A computing device 1600 can include some type of display element 1606, such as a touch screen or liquid crystal display (LCD), although many devices such as portable media players might convey information via other means, such as through audio speakers, and other types of devices such as server end stations may not have a display element 1606 at all. As discussed, some computing devices used in some embodiments include at least one input and/or output component(s) 1612 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

As discussed, different approaches can be implemented in various environments in accordance with the described embodiments. For example, FIG. 17 illustrates an example of an environment 1700 for implementing aspects in accordance with various embodiments. For example, in some embodiments commands are HyperText Transfer Protocol (HTTP) requests that are received by a web server (e.g., web server 1706), and the users, via electronic devices, may interact with the provider network via a web portal provided via the web server 1706 and application server 1708. As will be appreciated, although a web-based environment is used for purposes of explanation, different environments may be used, as appropriate, to implement various embodiments. The system includes an electronic client device 1702, which may also be referred to as a client device and can be any appropriate device operable to send and receive requests, messages or information over an appropriate network 1704 and convey information back to a user of the device 1702. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1704 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1704 includes the Internet, as the environment includes a web server 1706 for receiving requests and serving content in response thereto, although for other networks an alternative device serving a similar purpose could be used, as would be apparent to one of ordinary skill in the art.

The illustrative environment includes at least one application server 1708 and a data store 1710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1708 can include any appropriate hardware and software for integrating with the data store 1710 as needed to execute aspects of one or more applications for the client device 1702 and handling a majority of the data access and business logic for an application. The application server 1708 provides access control services in cooperation with the data store 1710 and is able to generate content such as text, graphics, audio, video, etc., to be transferred to the client device 1702, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1702 and the application server 1708, can be handled by the web server 1706. It should be understood that the web server 1706 and application server 1708 are not required and are merely example components, as structured code discussed herein can be executed on any appropriate device or host machine as discussed elsewhere herein.

The data store 1710 can include several separate data tables, databases, or other data storage mechanisms and media for storing data relating to a particular aspect. For example, the data store illustrated includes mechanisms for storing production data 1712 and user information 1716, which can be used to serve content for the production side. The data store 1710 also is shown to include a mechanism for storing log or session data 1714 and DRM information 1718 (e.g., DRM licenses) It should be understood that there can be many other aspects that may need to be stored in the data store, such as page image information and access rights information, which can be stored in any of the above listed mechanisms as appropriate or in additional mechanisms in the data store 1710. The data store 1710 is operable, through logic associated therewith, to receive instructions from the application server 1708 and obtain, update, or otherwise process data in response thereto. In one example, a user might submit a search request for a certain type of item. In this case, the data store 1710 might access the user information 1716 to verify the identity of the user and can access a production data 1712 to obtain information about items of that type. The information can then be returned to the user, such as in a listing of results on a web page that the user is able to view via a browser on the user device 1702. Information for a particular item of interest can be viewed in a dedicated page or window of the browser.

The web server 1706, application server 1708, and/or data store 1710 may be implemented by one or more electronic devices 1720, which can also be referred to as electronic server devices or server end stations, and may or may not be located in different geographic locations. Each of the one or more electronic devices 1720 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction of the environment 1700 in FIG. 17 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1418A-1418N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a play request for media from a user at a front end media player;
storing access units of the media in a sample queue by the front end media player according to a push data flow model in response to the play request;
storing respective metadata for the access units in a metadata queue;
obtaining a DRM license from a DRM server via the front end media player for the access units of media;
binding the DRM license to the access units of media to generate a bound DRM license for the access units by a DRM session manager comprising a master session manager coupled to the front end media player, a slave session manager coupled to a fragment media player, and a DRM binder between the master session manager and the slave session manager;
sending the bound DRM license for the access units to the fragment media player;
pulling the access units and the respective metadata by a renderer of the fragment media player from the sample queue and the metadata queue according to a pull data flow model based on the play request;
decrypting the access units of media with the bound DRM license by the fragment media player; and
rendering the access units and the respective metadata with the renderer of the fragment media player to generate rendered media.

2. The computer-implemented method of claim 1, further comprising controlling an amount of access units of media stored in the sample queue by causing a load monitor component to query a load control component via a message bus of the fragment media player.

3. The computer-implemented method of claim 1, further comprising splitting the access units of media into audio data and video data, wherein the storing the access units of media in the sample queue comprises storing the audio data in an audio sample queue and storing the video data in a video sample queue.

4. The computer-implemented method of claim 1, wherein the slave session manager is in one-way communication to the fragment media player.

5. A computer-implemented method comprising:
receiving a play request for media from a user at a first media player;
storing access units of the media in a sample queue by the first media player in response to the play request;
storing respective metadata for the access units in a metadata queue;
obtaining a DRM license from a DRM server via the first media player for the access units of media;
binding the DRM license to the access units of media to generate a bound DRM license for the access units by a DRM session manager comprising a master session manager coupled to the first media player, a slave session manager coupled to a second media player, and a DRM binder between the master session manager and the slave session manager;
sending the bound DRM license for the access units to the second media player;
pulling the access units and the respective metadata by a renderer of the second media player from the sample queue and the metadata queue based on the play request;
decrypting the access units of media with the bound DRM license by the second media player; and
rendering the access units and the respective metadata with the renderer of the second media player to generate rendered media.

6. The computer-implemented method of claim 5, further comprising controlling an amount of access units of media stored in the sample queue by causing a load monitor component to query a load control component via a message bus of the second media player.

7. The computer-implemented method of claim 5, further comprising splitting the access units of media into audio and video data, wherein the storing the access units of media in the sample queue comprises storing the audio data in an audio sample queue and storing the video data in a video sample queue.

8. The computer-implemented method of claim 5, wherein the play request is separate from the media.

9. The computer-implemented method of claim 5, wherein the slave session manager is in one-way communication to the second media player.

10. The computer-implemented method of claim 5, wherein the play request does not block the receiving of the access units of media from the first media player.

11. The computer-implemented method of claim 5, wherein the rendering comprises the second media player decoding the access units with the respective metadata and a codec of the second media player.

12. The computer-implemented method of claim 5, further comprising registering a load monitor component to a media feed comprising the sample queue and the metadata queue by a media period component.

13. The computer-implemented method of claim 5, further comprising loading the access units from a content data store by the first media player.

14. The computer-implemented method of claim 5, further comprising sending the rendered media to a device for playback.

15. A system comprising:
a content data store to store access units of media; and
a media rendering service implemented by a one or more electronic devices, the media rendering service including instructions that upon execution cause the one or more electronic devices to:
receive a play request for media from a user at a first media player;
store access units of the media in a sample queue by the first media player in response to the play request;
store respective metadata for the access units in a metadata queue;
obtain a DRM license from a DRM server via the first media player for the access units of media;
bind the DRM license to the access units of media to generate a bound DRM license for the access units by a DRM session manager comprising a master session manager coupled to the first media player, a slave session manager coupled to a second media player, and a DRM binder between the master session manager and the slave session manager;
send the bound DRM license for the access units to the second media player;
pull the access units and the respective metadata by a renderer of the second media player from the sample queue and the metadata queue based on the play request;
decrypt the access units of media with the bound DRM license by the second media player; and
render the access units and the respective metadata with the renderer of the second media player to generate rendered media.

16. The system of claim 15, wherein the media rendering service further includes instructions that upon execution cause the one or more electronic devices to: control an amount of access units of media stored in the sample queue by causing a load monitor component to query a load control component via a message bus of the second media player.

17. The system of claim 15, wherein the media rendering service further includes instructions that upon execution cause the one or more electronic devices to: split the access units of media into audio data and video data, wherein the store of the access units of media in the sample queue comprises storing the audio data in an audio sample queue and storing the video data in a video sample queue.

18. The system of claim 15, wherein the play request is separate from the media.

19. The system of claim 15, wherein the render comprises the second media player decoding the access units with the respective metadata and a codec of the second media player.

20. The system of claim 15, wherein the media rendering service further includes instructions that upon execution cause the one or more electronic devices to: load the access units from the content data store by the first media player.

* * * * *